(No Model.)  3 Sheets—Sheet 1.

E. THOMSON & W. H. PRATT.
INDUCTION WATTMETER.

No. 596,190. Patented Dec. 28, 1897.

WITNESSES.
Raymond H. Danforth
John W. Gibboney

INVENTORS.
Elihu Thomson and
William H. Pratt, by
Geo. R. Blodgett,
atty.

(No Model.) 3 Sheets—Sheet 3.

E. THOMSON & W. H. PRATT.
INDUCTION WATTMETER.

No. 596,190. Patented Dec. 28, 1897.

WITNESSES.
Raymond H. Danforth.
John A. Gibboney.

INVENTORS.
Elihu Thomson and
William H. Pratt, by
Geo. R. Blodgett,
atty.

UNITED STATES PATENT OFFICE.

ELIHU THOMSON, OF SWAMPSCOTT, AND WILLIAM H. PRATT, OF LYNN, MASSACHUSETTS, ASSIGNORS TO THE GENERAL ELECTRIC COMPANY, OF NEW YORK.

INDUCTION-WATTMETER.

SPECIFICATION forming part of Letters Patent No. 596,190, dated December 28, 1897.

Application filed September 7, 1897. Serial No. 650,760. (No model.)

*To all whom it may concern:*

Be it known that we, ELIHU THOMSON, residing at Swampscott, and WILLIAM H. PRATT, residing at Lynn, in the county of Essex and State of Massachusetts, citizens of the United States, have invented certain new and useful Improvements in Induction-Wattmeters, (Case No. 606,) of which the following is a specification.

The present invention has for its object to provide a wattmeter capable of accurately measuring the energy consumed in a single-phase alternating-current circuit, whether the load be inductive or non-inductive, and one which can be adjusted for use on circuits of different frequencies.

Figure 1:
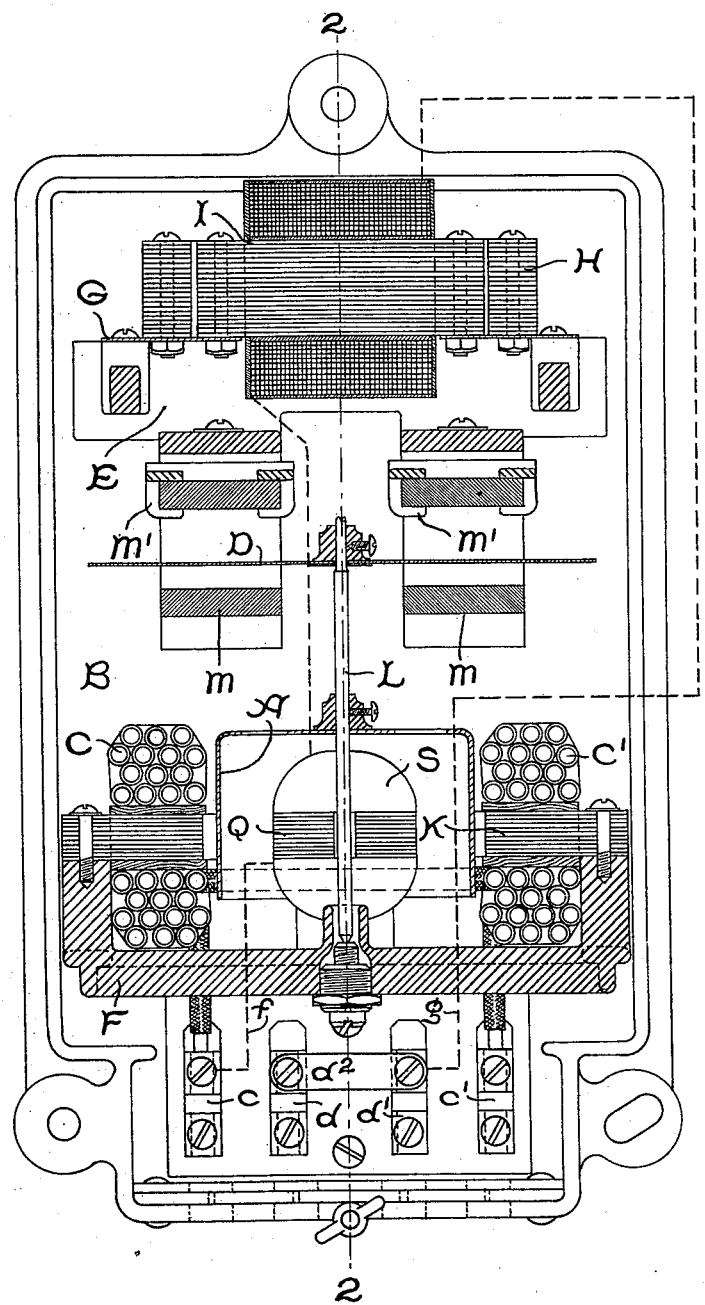
Figure 2:
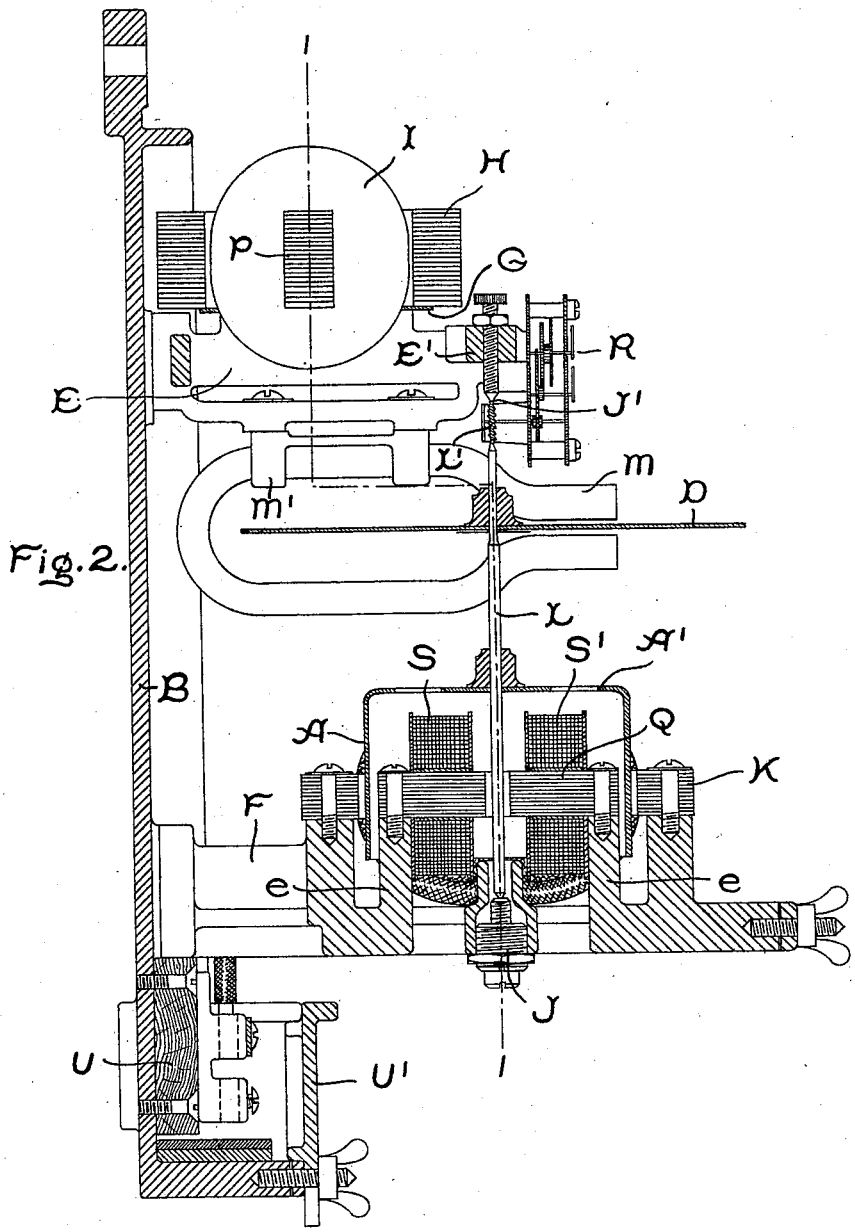
Figure 3:
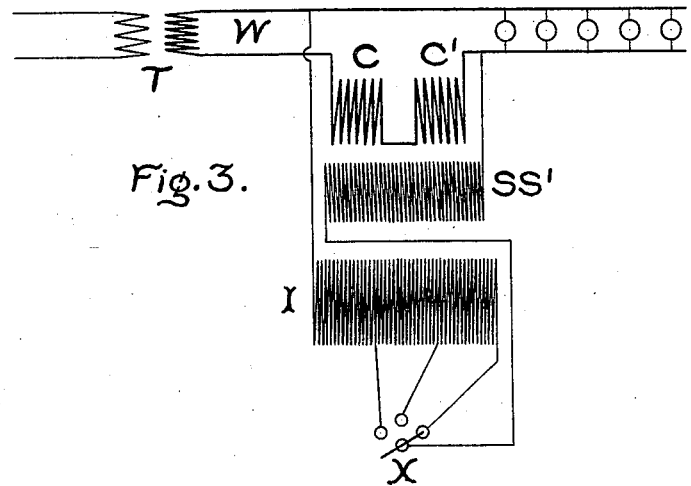
Figure 4:
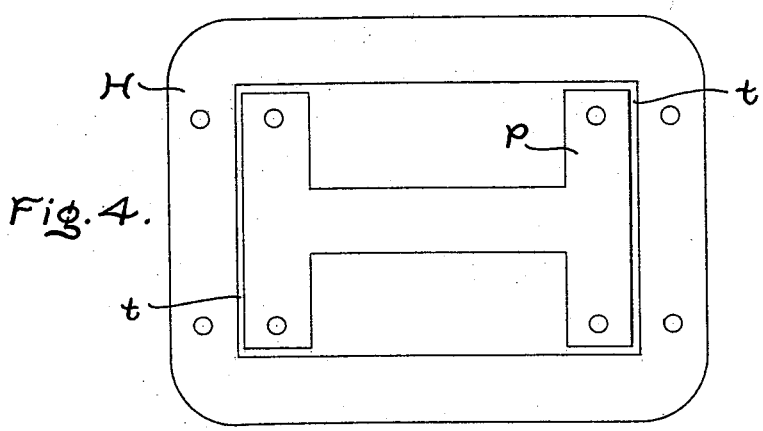
Figure 5:
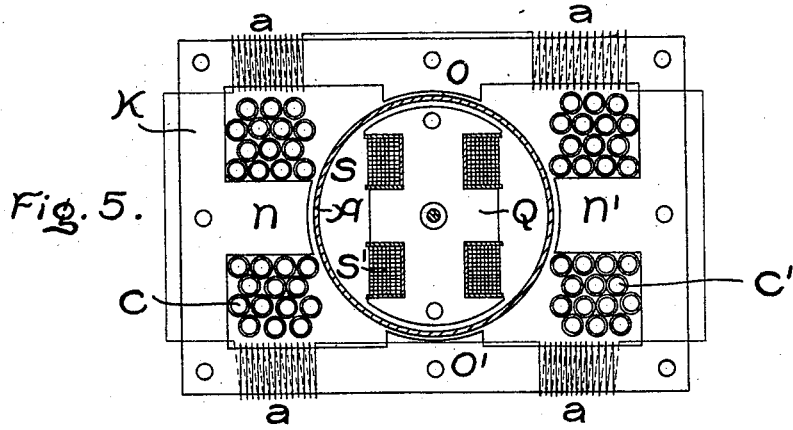

In the accompanying drawings, Figure 1 is a sectional view of our improved meter, taken on line 1 1 of Fig. 2. Fig. 2 is a sectional view taken on the line 2 2 of Fig. 1. Fig. 3 is a diagram of connections. Fig. 4 is a detail of the core upon which the induction-coil is wound, and Fig. 5 is a detail view of the motor mechanism.

Mounted upon a cast-metal back B are brackets E and F, which support the parts of the meter mechanism. Secured to the under side of the bracket E by clamps M' are permanent magnets M. Revolving within the influence of these magnets is a disk D, of good conducting material, mounted upon the armature-shaft L and employed to damp the rotation of the armature A in the usual manner.

In the operation of single-phase meters, wherein an inductance is employed to cause the current in one set of coils to lag behind that of another set, it has been found that when a short air-gap is included in the magnetic circuit of the core of the reactive coil the readings obtained from the meter are practically correct throughout its entire range, whereas with a reactive coil having a closed core the readings obtained at one portion of the range are accurate, but away from this there is an appreciable error. In the construction of our meter we utilize this fact and mount upon the upper side of the bracket an inductance I, comprising a two-part core having an air-space between the parts, as shown in Fig. 4. The portion H of the core is rectangular and is cut away in the center to receive the H-shaped part P of the core. Between the two is an air-gap at points *t t*. By the arrangement shown the total air-gap between the parts of the core is always maintained the same. For example, assume that for any reason the core P is nearer to core H at one end than the other. This will decrease the air-gap at one end, but increase it by a like amount at the other end. The same would be true if the core were moved up or down. On account of this arrangement it is necessary to exercise more than the usual care in assembling the meters, which is a decided advantage in reducing the cost of construction.

It being necessary to separate the parts of the core from each other by an air-gap or a piece of non-magnetic material, the parts of the core are bolted to a piece of German silver G, which in turn is secured to the two arms of the bracket E by screws.

Connecting the outer ends of the bracket-arms is a piece E', which supports the jewel-bearing J' at the upper end of the armature-shaft L. In addition to this the registering mechanism R is also carried by E'. On the upper end of the armature-shaft is a worm L', meshing with a worm-wheel for actuating the recording mechanism. Secured to the lower bracket F by screws is a field-magnet structure K, (best shown in Fig. 5,) made of laminated iron. This is provided with poles N and N', which are wound with coarse wire in a direction to produce unlike poles and unwound neutral poles O and O'. Extending upwardly from the bracket are lugs *e*, and secured thereto by screws is a laminated magnet Q, of the form best shown in Fig. 5. Wound upon this magnet are fine-wire coils S and S'. These are connected in series with each other and the inductance I. The magnet Q and coils S S' have their axes at right angles to that of coils C C', so that unlike poles will be created by the coils S S' at right angles to the poles induced by coils C C'. The phase of the current flowing in coils S S', owing to the large inductance I and also to the inductance of the coils themselves, will lag behind the current in the series coil by an amount somewhat less than ninety degrees, and consequently the flux induced by S S' in magnet Q will tend to lag behind the flux induced by S S' by an approximately equal amount. In addition to the series coils C C' the magnet-frame K is provided with coils $a$. These coils may either be closed upon themselves or connected in series in a closed local circuit. The coils are preferably so connected that the electromotive force induced therein by the changes in magnetism is in the same direction. The current in coils $a$ induces or tends to induce a third flux, which lags behind the flux induced by coils S S', and these two fluxes combine to establish a potential flux passing through the poles of the coils C C', which has a normal phase difference of ninety degrees from the flux of the current-coils C C'. By adjusting the number of turns in coils $a$ $a$ or their conductivity it is possible to adjust the phase difference between the two energizing magnetic fluxes, as may be desired. The poles O O' are neutral with respect to the field-coils C C', but are inductively made poles by the flux in magnet Q, which is at right angles to that between poles N and N'. The effect of this is to produce a shifting of the magnetic fluxes in accordance with the phases of current in the two sets of coils and thereby cause rotation of the closed-circuit armature A between the poles.

The armature consists of a cylinder, of copper, aluminium, or other good conducting non-magnetic material, and is provided with a disk and hub A' for securing it to the armature-shaft L. The armature-shaft is provided at the bottom with a jewel-bearing J and at the top with a jewel-bearing J', both of which are adjustable, so that the position of the armature can be changed.

Situated in the lower part of the meter is a connection-board U having terminals mounted thereon, and at the front is provided a removable cover U'. Terminals $c$ and $c'$ are connected, respectively, to the field-coils C and C' and are included in the same side of the system. Terminals $d$ and $d'$ are connected together by a strap $d^2$ and to the opposite side of the system. Extending from terminal $c$ is a wire $f$, which connects the fine-wire coils S S' in series with the inductance I. The opposite end of the inductance is connected by wire $g$ to terminal $d'$.

In Fig. 3 the meter is shown as connected to a single-phase circuit having a transformer T, supplying current to the secondary system W, having a load consisting of incandescent lamps, but which may comprise motors or other translating devices. The field-coils C and C' are included in series with one of the secondary mains and the winding S S' is connected in series with inductance I and both are connected across the secondary mains.

As the frequencies of working systems are often different, it is desirable to provide a meter which will work equally well upon them all. To accomplish this, the reactive coil I is divided into sections and a switch X arranged to vary the turns of the coil in circuit to adjust the meter for use on a system having a given frequency. For example, assume that the meter has been employed on a system where the frequency was sixty cycles per second and it is desired to adjust the meter to work on a system having one hundred and twenty-five cycles. The switch X would be moved to a point where it would cut out the two end sections of the coil I. This would bring the same condition of lag in the coils S and S' that they had before and the meter would accurately register the consumption of energy. Preferably the various positions of the switch would be marked with the frequency to which they correspond, and by knowing the frequency of the system to which the meter was connected it would be a simple matter to adjust it for that system.

What we claim as new, and desire to secure by Letters Patent of the United States, is—

1. In an electric meter, the combination of a field-magnet structure forming a closed iron frame with poles for the current and potential fluxes at points ninety degrees apart, a cylindrical armature, and a magnet structure within the armature whose magnetic circuit is completed through certain of the poles on the external frame.

2. The combination in an electric meter, of a closed magnetic field-magnet frame having inwardly-projecting sets of poles for the current and potential fluxes arranged concentrically around a center, and an internal magnet structure constructed and arranged to afford a much shorter air-gap in the path of the potential flux than in that of the current flux.

3. The combination in an electric meter of a closed magnetic frame having two sets of inwardly-projecting poles ninety degrees apart, one set wound with a current-coil, and the second set unwound, a cylindrical armature, and an iron structure within the cylinder on which is wound the potential coil, with its magnetic axis at right angles to that of the current-coil.

4. In an electric meter, the combination of a closed iron frame carrying a current-coil, a a magnet structure within and separated from the frame by a space in which the armature turns, and carrying a potential coil, and a closed-circuit winding on the frame arranged to increase the phase difference between the magnetic fluxes energizing the meter.

5. In a motor mechanism for an alternating-current meter, the combination of a stationary laminated field-magnet having two wound poles of opposite polarity and two unwound neutral poles, field-coils included in series with the load-circuit, fine-wire coils mounted on the field-magnet and connected in closed-circuit relation, a fixed laminated magnet mounted within the first and having poles adjacent to the neutral poles of the field-magnet, a fine-wire winding thereon for creating a flux at right angles to that of the wound field-magnet coils, and a cylindrical armature revolving between the magnets.

6. In an alternating-current electric meter, the combination of an inductance comprising a closed-circuit laminated-iron core provided with a central opening, a wound core mounted within the first and separated therefrom at all points by an air-gap, the arrangement being such that as the air-gap is decreased at one point, it is increased at another, so that the total air-gap is always maintained the same.

7. In an alternating-current electric meter, the combination of an inductance comprising a closed-circuit iron core having a rectangular opening in the center, an H-shaped wound core mounted within the first and separated therefrom at all points by an air-gap, the arrangement being such that as the air-gap is increased at one side or end between the inner and outer core, it is decreased by a like amount at the opposite point, so that the magnetic reluctance is always maintained the same.

8. In an electric meter, the combination of a cast-metal back, a laminated-iron core having an opening therein, a second core mounted in said opening and separated from the core at all points by an air-space, and a non-magnetic plate secure to the back and forming a common support for both cores.

In witness whereof we have hereunto set our hands this 2d day of September, 1897.

ELIHU THOMSON.
WILLIAM H. PRATT.

Witnesses:
JOHN W. GIBBONEY,
HENRY O. WESTENDARP.